United States Patent
Scott et al.

(12) 
(10) Patent No.: US 6,227,521 B1
(45) Date of Patent: May 8, 2001

(54) GRADUATED RELEASE VALVE

(75) Inventors: Trevor A. Scott, Gimbsy; Ulf Stahmer, Toronto, both of (CA)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/475,846

(22) Filed: Dec. 30, 1999

(51) Int. Cl.$^7$ .............................. B60T 8/42; F16K 31/143
(52) U.S. Cl. ..................... 251/63; 251/282; 303/115.1; 303/117.1
(58) Field of Search ................. 251/63, 282, 62, 251/129.07, 281, 325, 48, 53, 54, 55; 303/115.1, 115.4, 117.1, 118.1

(56) References Cited

U.S. PATENT DOCUMENTS

| | | | |
|---|---|---|---|
| 3,457,957 | * | 7/1969 | Mueller ............................ 251/282 X |
| 4,651,764 | * | 3/1987 | Miller et al. ........................ 251/63 X |
| 4,987,919 | * | 1/1991 | Boutin ................................ 251/63 X |
| 5,046,530 | * | 9/1991 | Gossner et al. .................... 251/282 X |
| 5,378,055 | * | 1/1995 | Maas et al. ..................... 303/115.4 X |
| 5,403,078 | * | 4/1995 | Farr .................................... 303/117.1 |
| 5,626,403 | * | 5/1997 | Beck et al. ........................ 303/117.1 |
| 5,628,550 | * | 5/1997 | Zaviska et al. ................... 303/115.4 |

* cited by examiner

Primary Examiner—Kevin Shaver
Assistant Examiner—Eric Keasel
(74) Attorney, Agent, or Firm—James Ray & Associates

(57) ABSTRACT

An apparatus incrementally reduces pressure in a first volume in response to an increase in pressure in a second volume. A valve body defines a bore that houses a piston and supply and return passages that communicate with first and second ends of the bore, respectively. The valve body also defines a release passage that connects the bore with the first volume and an exhaust passage that connects the bore with atmosphere. An inlet valve opens when pressure in the second volume increases relative to pressure in the supply passage. An outlet valve opens when pressure in the second volume decreases relative to pressure in the return passage. The piston is biased in a closed position against the first end and defines a passageway through which the first and the second ends communicate. When pressure increases in the second volume, the inlet valve opens causing the first end to pressurize and move the piston to an open position in which the release and exhaust passages communicate. This allows the first volume to vent gradually to atmosphere. As the pressure gradually equalizes between the first and second ends via the passageway, the piston returns to its closed position thereby discontinuing communication between the release and exhaust passages so that the first volume is cut off from atmosphere. When pressure decreases in the second volume, the outlet valve opens causing pressure to equalize between the supply and return passages via the passageway and to approximate the pressure in the second volume.

13 Claims, 3 Drawing Sheets

GRADUATED RELEASE VALVE

FIELD OF THE INVENTION

The invention generally relates to pneumatic valves of the type commonly used to manipulate pressure within the brake control system of a railcar of a train. More particularly, the invention pertains to a regulating valve that serves to release pressure from the brake cylinder incrementally in response to increases in pressure occurring in the brake pipe of a railcar.

BACKGROUND OF THE INVENTION

The following background information is provided to assist the reader to understand the environment in which invention will typically be used. The terms used herein are not intended to be limited to any particular narrow interpretation unless specifically stated otherwise in this document.

A typical freight train includes one or more locomotives, a plurality of railcars and a pneumatic trainline referred to as the brake pipe. The brake pipe consists of a series of individual pipe lengths interconnected to each other. One pipe length secured to the underside of each railcar interconnects to another such pipe length via a flexible coupler situated between each railcar. The brake pipe supplies the pressurized air that is required by the brake control system to charge the various reservoirs and operate the air brake equipment on each railcar in the freight train.

A train operator situated in the lead locomotive can manipulate a brake handle to apply and release the brakes on the railcars as desired. The brake handle can be moved from and in between a release position at one extreme in which brake pipe pressure is maximum and the brakes are completely released to an emergency application position at another extreme in which brake pipe pressure is essentially zero and the brakes are fully applied. The brake handle positions thus include brake release, minimum service brake application, full service brake application and emergency brake application. When the brakes are released, the reservoirs and the brake pipe are generally charged to the same pressure: typically 90 psi on a freight train and 110 psi on a passenger train. When the brakes are applied, the pressure in the brake pipe is reduced typically through a valve located in the lead locomotive. The exact amount by which the pressure is reduced depends into which of the application positions the brake handle is placed. It is this pressure reduction that signals the brake control valve on each railcar to supply pressurized air from the appropriate reservoir(s) to the brake cylinders. The brake cylinders convert this air pressure to mechanical force and mechanical linkage transmits the mechanical force from the brake cylinders to the brake shoes. The brake shoes apply this mechanical force to slow or stop the rotation of the wheels on the railcar. Assuming the brake signal is successfully communicated throughout the train, the brakes of every railcar in the train respond in the generally same manner.

The brake equipment on each railcar of a freight train typically includes one or more brake cylinders, an emergency air reservoir, an auxiliary air reservoir and a conventional pneumatic brake control valve such as an ABDX, ABDW, DB60 or similar type control valve. The ABDX and ABDW brake control valves are made by the Westinghouse Air Brake Company (WABCO) and are well known in the brake control art.

FIG. 1 illustrates a schematic diagram of a pneumatic brake control system of a railcar featuring an ABDX type pneumatic brake control valve. This control valve includes a service portion and an emergency portion typically mounted on opposite sides of a pipe bracket. The pipe bracket features a number of internal passages and several ports. Each port connects to one of the interconnecting pipes from the railcar such as those leading to the brake pipe, the brake cylinder, the emergency reservoir, the auxiliary reservoir and the retaining valve. It is through these ports and internal passages of the pipe bracket that the relevant portions of the control valve communicate fluidly with the pneumatic piping on the railcar.

Railcars are also often equipped with a combination access and receiver assembly that enables an Automated Single Car Tester to measure the pressure at various points within the brake control system of the railcar. An access plate portion of the assembly is typically connected between the pipe bracket and the service portion of the brake control valve. A receiver portion together with the access plate provides access to the internal passageways of the pipe bracket. The combined assembly is the part through which the Automated Single Car Tester can measure pressure within the brake cylinder, the brake pipe, the emergency reservoir and the auxiliary reservoir on the railcar. The combined assembly and the Automated Single Car Tester are also both made by WABCO and well known in the brake control art.

The service and emergency portions of the pneumatic brake control valve operate according to principles known in the railroad industry. The service portion of the control valve performs several functions including (1) controlling the flow of air from the auxiliary reservoir to the brake cylinders during a service brake application, (2) controlling the recharging of the auxiliary and emergency reservoirs, and (3) controlling the exhausting of the brake cylinders when the brakes are released. The emergency portion of the control valve controls, among other things, the flow of air from both reservoirs to the brake cylinders during an emergency brake application. The emergency portion can also accelerate this increase in brake cylinder pressure by venting the brake pipe locally at the railcar.

The ABDX, ABDW, DB60 and similar type brake control valves respond to decreases in brake pipe pressure differently from how they respond to increases in brake pipe pressure. By way of example, a typical freight railcar may feature a brake control valve designed to work with a brake pipe that is chargeable to 90 psi. With the brake handle in the full release position, the brake pipe charges to 90 psi at which level the brake control valve completely depressurizes the brake cylinders thereby fully releasing the brakes on the railcar. By moving the brake handle back towards the application extreme of its spectrum, the brake pipe pressure would decrease accordingly. The brake control valve would respond to this decrease in brake pipe pressure by increasing pressure in the brake cylinders to apply the brakes. Should the brake handle be moved even further to the full service application position, the brake pipe pressure would decrease to approximately 68–70 psi. The brake control valve would respond by increasing the brake cylinder pressure to approximately 64 psi to apply the brakes fully. The brake control valve is thus capable of incrementally increasing pressure in the brake cylinders as the pressure within the brake pipe is decreased incrementally.

One disadvantage to such prior art brake control valves is that they are incapable of incrementally reducing the brake cylinder pressure in response to increasing brake pipe pressure. This is perhaps best illustrated by considering how a train is operated over hilly terrain. As a train descends a hill, the train operator may be required to apply the brakes to slow the train. By moving the brake handle towards the application extreme of its spectrum, the brake pipe pressure decreases and the brake control valve responds by allowing air from the auxiliary reservoir to flow into the brake cylinders to apply the brakes. Should the train slow too much, however, the train operator may need to increase speed again, for example, to maintain a schedule or to prepare for an upcoming hill.

There are two ways in which the speed of the train can be increased while descending a hill. Specifically, the train operator can either (i) modify the braking effort so that the train again reaches the desired speed or (ii) keep the brakes applied and increase the speed by engaging the propulsion motors of the locomotive. Regarding the former alternative, the ABDX, ABDW, DB60 and similar type brake control valves, however, do not allow the brake cylinders to be depressurized incrementally. Moving the brake handle back towards the release extreme of its spectrum does cause the brake pipe pressure to increase accordingly. But once brake pipe pressure increases beyond a set threshold (i.e., typically 2–4 psi above auxiliary reservoir pressure), the brake control valve completely empties the brake cylinders thereby releasing the brakes fully. For the train operator to slow the train using this approach, the only way to reduce braking effort from, say, a full service 64 psi to 20–30 psi brake cylinder pressure is to empty the brake cylinders completely and then repressurize them to the desired level. This is, of course, impractical as it takes minutes to do so, the exact time depending on the length of the train. Consequently, the only safe way to increase speed in such circumstances is to leave the brakes on and engage the locomotive engines to overcome the brake drag. This approach is quite inefficient as it, for example, increases both fuel consumption and wear of the brake shoes.

OBJECTIVES OF THE INVENTION

It is, therefore, an objective of the invention to enable a train operator to reduce incrementally the force with which the brakes are applied on a railcar of a train.

Another objective is to provide a graduated release valve apparatus that incrementally reduces the pressure within the brake cylinders in response to relatively small increases in pressure occurring within the brake pipe of a train.

Yet another objective is to allow the brake cylinder pressure to be released incrementally in response to relatively small increases in brake pipe pressure without affecting the ability of the pneumatic brake control valve to release such pressure completely.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the accompanying drawings and claims.

SUMMARY OF THE INVENTION

In a presently preferred embodiment, the invention provides a graduated release valve apparatus for a pneumatic brake system of a railcar equipped with a brake cylinder and a brake pipe. The graduated release valve apparatus incrementally reduces pressure in the brake cylinder in response to each increase in pressure in the brake pipe. The graduated release valve apparatus includes a valve body, a first valve means and a second valve means. The valve body defines (i) a piston bore in which a piston is moveable, (ii) a supply passage in communication with a first end of the piston bore and (iii) a return passage in communication with a second end of the piston bore. The valve body also defines (iv) a release passage for connecting the piston bore with the brake cylinder and (v) an exhaust passage for connecting the piston bore with atmosphere via an exhaust choke. The first valve means allows air from the brake pipe to flow into the supply passage when pressure in the brake pipe increases relative to pressure in the supply passage. The second valve means allows-air from the return passage to flow into the brake pipe when pressure in the brake pipe decreases relative to pressure in the return passage. The piston is biased in a normally closed position against the first end within the piston bore. The piston defines a passageway through which the first and the second ends communicate. When the pressure increases within the brake pipe, the first valve means opens causing the first end to pressurize and move the piston to an open position in which communication is established between the release and exhaust passages. This allows the brake cylinder to vent gradually to atmosphere via the exhaust choke. As the pressure gradually equalizes between the first and second ends via the passageway, the piston returns to its normally closed position thereby discontinuing communication between the release and exhaust passages so that the brake cylinder ceases venting to atmosphere. When the pressure decreases within the brake pipe, the second valve means opens causing pressure to equalize between the supply and return passages via the passageway and to approximate the pressure contained within the brake pipe.

DETAILED DESCRIPTION OF THE INVENTION

Figure 1:
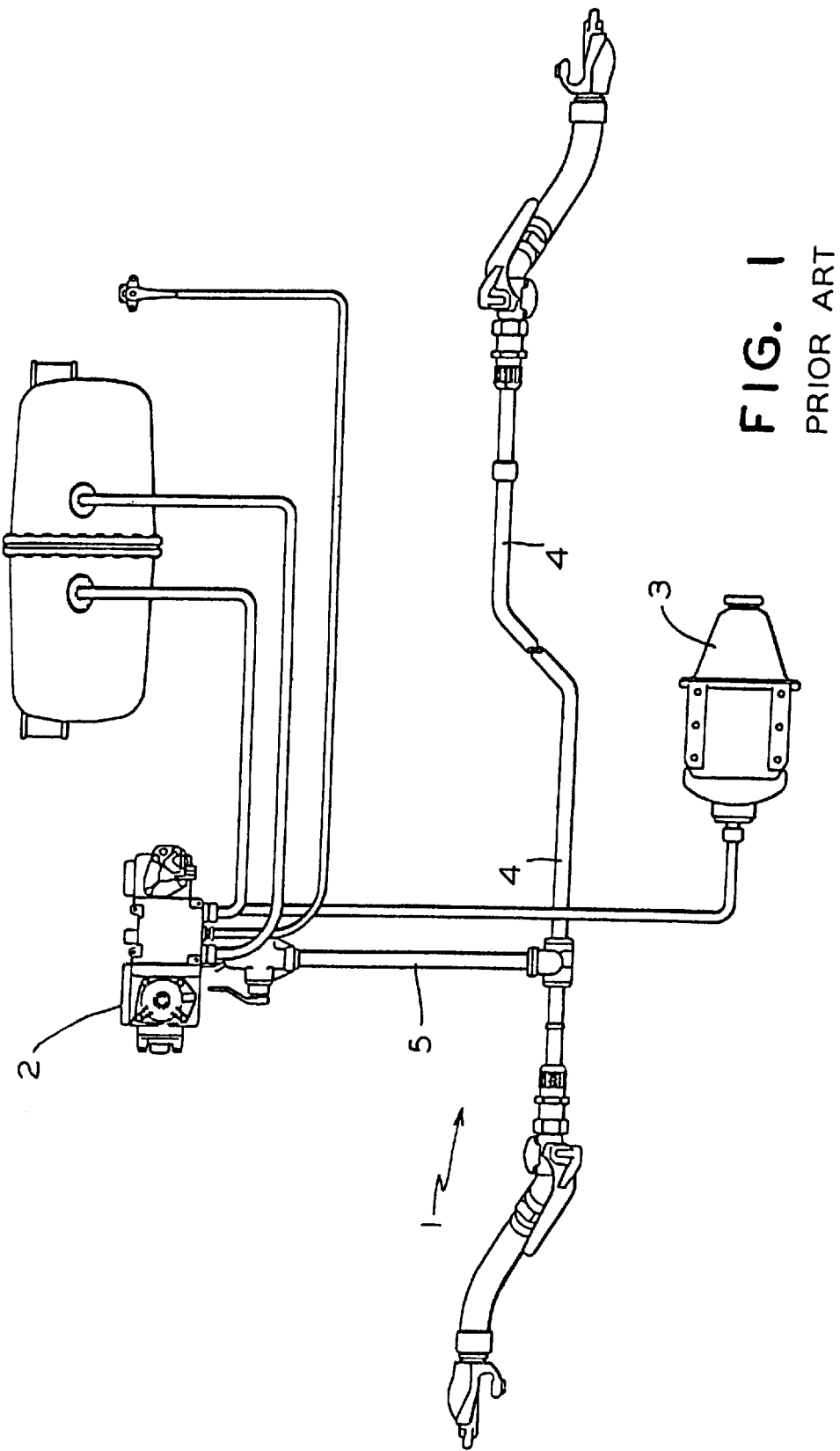
FIG. 1 is a schematic view of a pneumatic brake control system of railcar of a train.

Before describing the present invention in detail, the reader is advised that, for the sake of clarity and understanding, identical components having identical functions in each of the accompanying drawings have been marked where possible with the same reference numerals in each of the Figures provided in this document. Moreover, to simplify its explanation, the invention is described in the ensuing paragraphs as if incorporated into the pneumatic brake control system of a railroad car. It should be apparent, however, that it could be implemented in a variety of other pneumatic systems.

FIG. 1 illustrates a schematic of the typical layout of a pneumatic brake control system on a railcar of a train. Of particular importance to a preferred embodiment of the invention is that the pneumatic brake control system 1 includes an ABDX, ABDW, DB60 or similar type brake control valve 2. It is to this brake control valve that the brake cylinder 3 connects directly and the brake pipe 4 connects indirectly via a branch pipe 5.

Figure 2:
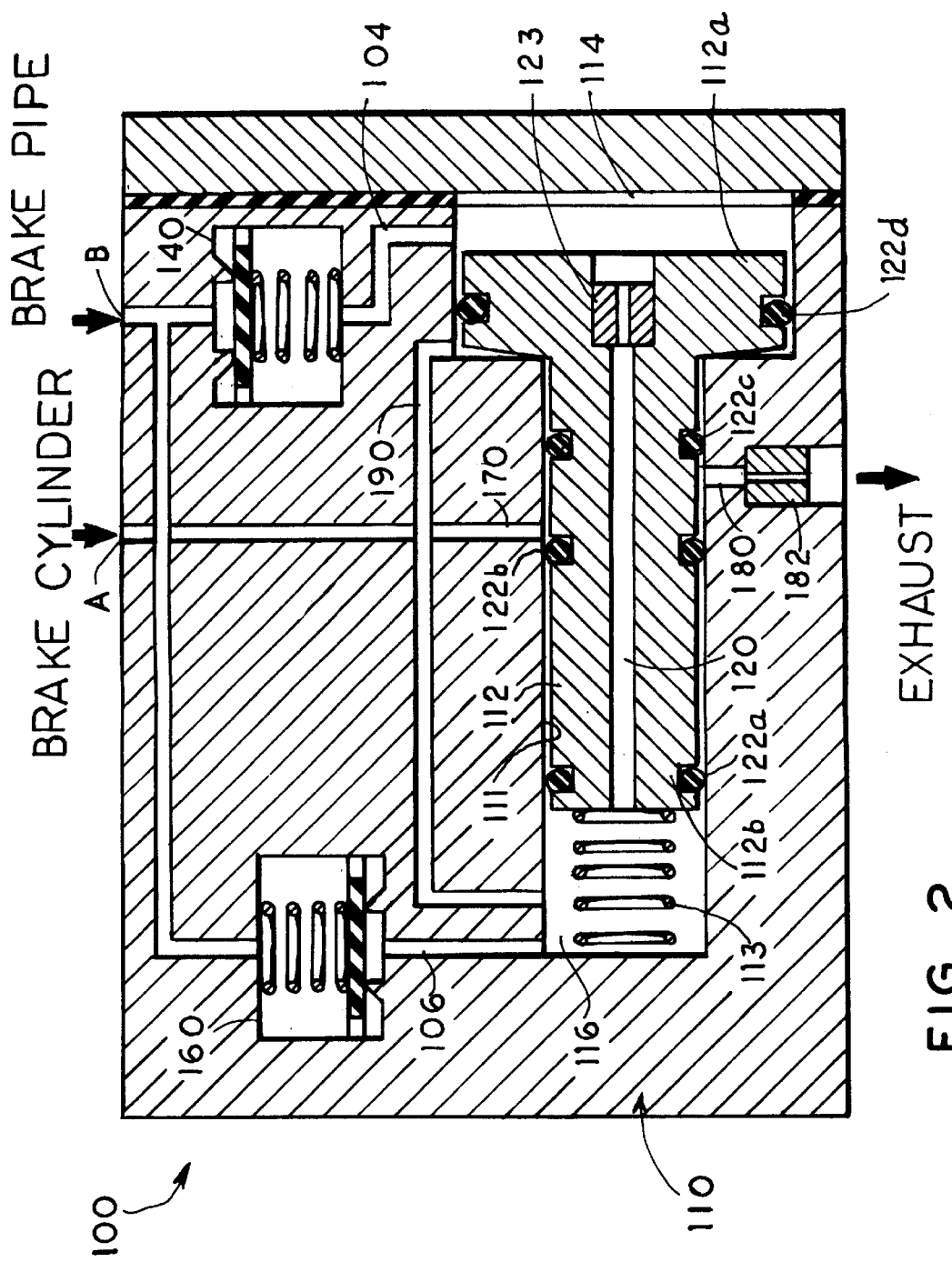
FIG. 2 is a schematic view of a graduated release valve apparatus operated in a non-steady state condition.
Figure 3:
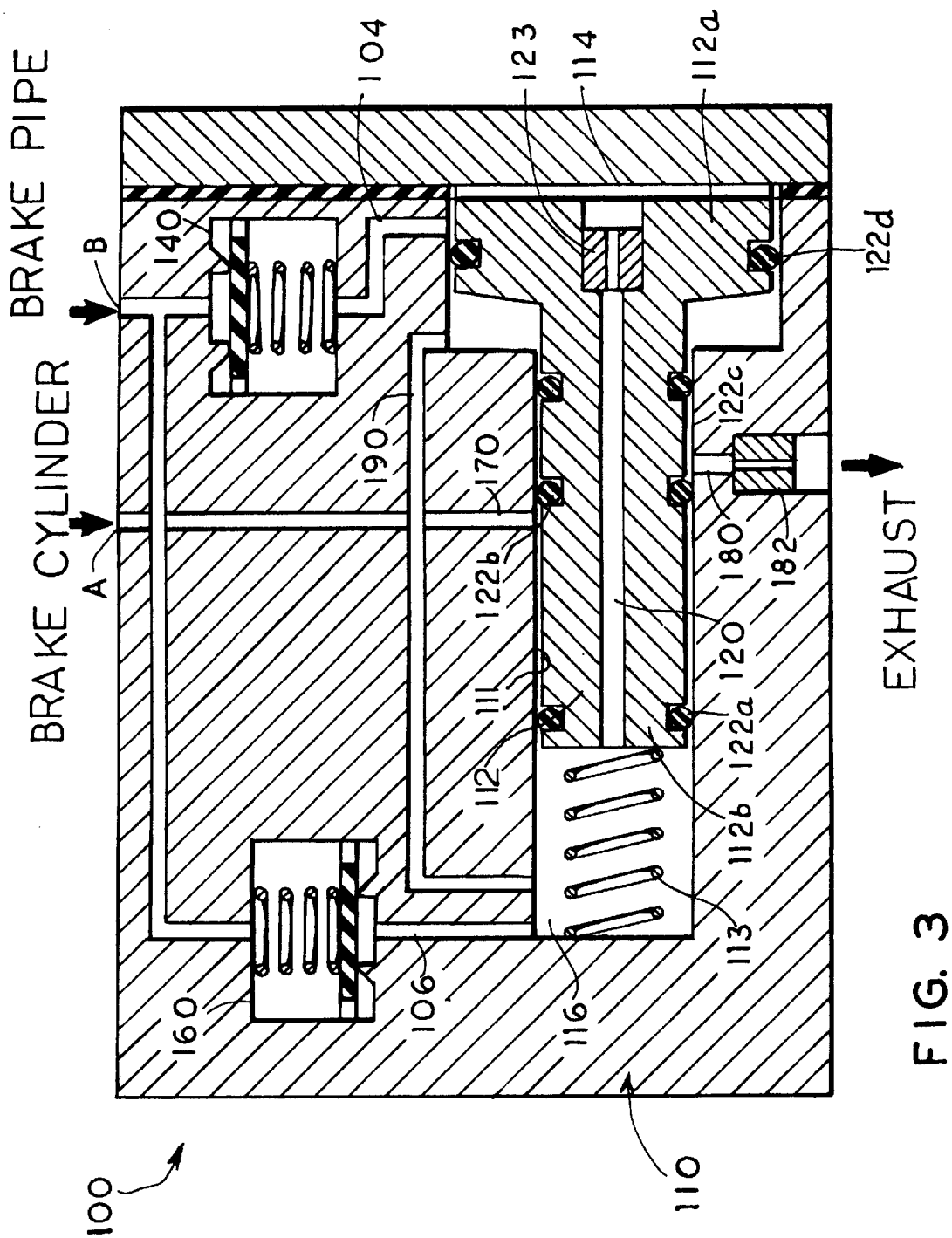
FIG. 3 is a schematic view of a graduated release valve apparatus as operated in a steady state condition.

Referring now to the presently preferred embodiment of the invention, FIGS. 2 and 3 each illustrate a graduated release valve apparatus 100 that is designed to be used with the pneumatic brake control system 1 shown in FIG. 1. Specifically, the apparatus 100 is intended to be connected to the brake cylinder 3 and the brake pipe 4 via ports A and B.

The graduated release valve apparatus includes a valve body 110, a inlet check valve 140 and an outlet check valve 160. The valve body 110 defines a supply passage 104, a return passage 106 and a piston bore 111. The supply passage 104 communicates directly with a first end 114 of piston bore 111. Similarly, the return passage 106 communicates directly with a second end 116 of piston bore 111. The valve body 110 also defines a release passage 170, an exhaust passage 180 and a vent passage 190. The release passage 170 connects bore 111 to the brake cylinder 3 via port A. The exhaust passage 180 connects bore 111 with atmosphere preferably via an exhaust choke 182.

The piston bore houses a piston 112 whose head portion 112a is preferably larger than its shaft portion 112b. A spring 113 is compressively situated between the second end 116 of piston bore 111 and the top of the shaft portion 112b. Spring 113 biases the piston in a normally closed position in which its head portion 112b lies against the first end of piston bore 111 as shown in FIG. 3. With the piston 112 in the closed position, a chamber 117 exists between the back side of head portion 112b and the corresponding inner surface of bore 111. The vent passage 190 connects chamber 117 to the second end 116 of bore 111. The piston 112 defines a passageway 120 through which the first and second ends of bore 111 communicate. The piston 112 also defines in its circumference four grooves, each of which retaining an o-ring. Each o-ring 122a–d serves to seal the piston against the surface of the inner wall of bore 111 no matter to which position piston 112 is moved.

The inlet and outlet check valves 140 and 160 are each connected to the brake pipe 4 preferably through a common port B. The inlet check valve 140 is oriented between port B and supply passage 104 so that it normally cuts off brake pipe 4 from the supply passage 104. When the pressure in brake pipe 4 rises relative to the pressure in supply passage 104, the inlet check valve 140 opens from its normally closed position to allow air from brake pipe 4 to flow into the supply passage 104. Similarly, the outlet check valve 160 is oriented between return passage 106 and port B so that it normally cuts off communication therebetween. When the pressure in return passage 106 rises relative to that in the brake pipe, the outlet check valve 160 opens from its normally closed position to allow air from return passage 106 to flow back into the brake pipe.

Regarding the operation of the graduated release valve apparatus 100, the inlet check valve 140 opens upon an increase in pressure within the brake pipe. This pressure increase allows the first end or cavity 114 to pressurize via supply passage 104 thereby causing the piston 112 to move to an open position as shown in FIG. 2. To prevent pneumatic lockup of piston 112 within bore 111, vent passage 190 allows the air in chamber 117 to vent to the second end 116 of bore 111 so that piston 112 can indeed move into the open position. O-rings 122a–d are deployed along piston 112 so that the release and exhaust passages 170 and 180 communicate only when piston 112 occupies the open position. O-ring 122d also isolates chamber 117 from the first end 114 of bore 111. With the piston moved to the open position, the graduated release valve apparatus 100 assumes a non-steady state mode of operation in which the brake cylinder vents to atmosphere via release passage 170, bore 111 and exhaust passage 180. The exhaust choke 182 is placed within or otherwise connected to exhaust passage 180 so as to assure that the brake cylinder vents to atmosphere gradually for each increase in pressure within the brake pipe 4.

As the pressure on opposite sides of inlet check valve 140 stabilizes, the pressure between the first and second ends of bore 111 gradually equalizes due to a second choke 123 placed within or otherwise connected to passageway 120. This equalization of pressure causes spring 113 to return the piston 112 to its normally closed position as shown in FIG. 3. With piston 112 again closed against the first end of bore 111, the release and exhaust passages 170 and 180 no longer communicate due to the deployment of 0-rings 122a–d. The graduated release valve apparatus 100 thus assumes a steady state mode of operation in which the brake cylinder can no longer vent to atmosphere via passages 170 and 180 and exhaust choke 182.

Regarding how the graduated release valve apparatus 100 responds to a drop in brake pipe pressure, the outlet check valve 160 opens upon each decrease in brake pipe pressure relative to the pressure contained within the return passage 160 of apparatus 100. As the higher pressure air within the return passage 160 escapes to the brake pipe, air flows from the first to the second end of bore 111 via passageway 120 and choke 123 thereby gradually equalizing the pressure therebetween. In this manner, the higher pressure air within the apparatus 100 escapes to the brake pipe via return passage 160. The outlet check valve 160 thus ensures that the pressure within apparatus 100 will generally not exceed that contained with the brake pipe 4.

Operating in the described manner, the graduated release valve apparatus 100 is intended to work independently of the ABDX, ABDW or DB60 or similar type pneumatic brake control valves. These brake control valves are designed to drop brake cylinder pressure completely and thus fully release the brakes once pressure within the brake pipe increases beyond a set threshold above that contained within the auxiliary reservoir. The graduated release valve apparatus 100, however, is designed to react to increases in brake pipe pressure to which such brake control valves do not respond. As long as each increase in brake pipe pressure does not rise beyond that threshold above which the brake control valve will completely release the brakes, the graduated release valve apparatus will reduce the braking effort incrementally in response to each such increase in brake pipe pressure. By moving the brake handle incrementally from the application position towards the release position so as to achieve such a small increase in brake pipe pressure, the invention 100 will allow the brakes to be released incrementally accordingly. Should a complete release of the brakes be desired, the brake control valve will be unaffected by the invention and respond in the aforementioned well known manner. The invention thus provides a way of releasing the brake cylinder pressure incrementally without affecting the ability of the brake control valve to release such pressure completely.

It should be apparent that there are several places within the pneumatic brake control system of a railcar in which the graduated release valve apparatus could be inserted or otherwise installed. The invention could take the form of a separate device connected via ports A and B to the brake cylinder and to the brake pipe upstream of the service and emergency portions of the brake control valve. It could also be connected to the combination access and receiver assembly via which such connections to the brake cylinder and brake pipe can be made.

The presently preferred embodiment for carrying out the invention has been set forth in detail according to the Patent Act. Those persons of ordinary skill in the art to which this invention pertains may nevertheless recognize various alternative ways of practicing the invention without departing from the spirit and scope of the following claims. Those of such skill will also recognize that the foregoing description is merely illustrative and not intended to limit any of the ensuing claims to any particular narrow interpretation.

Accordingly, to promote the progress of science and the useful arts, we secure for ourselves by Letters Patent exclusive rights to all subject matter embraced by the following claims for the time prescribed by the Patent Act.

We claim:

1. A graduated release valve apparatus for a pneumatic brake system of a railcar, said railcar having a brake cylinder and a brake pipe, said graduated release valve apparatus comprising:

(a) a valve body defining a piston bore, a supply passage in communication with a first end of said piston bore, a return passage in communication with a second end of said piston bore, a release passage for connecting said piston bore with such brake cylinder, and an exhaust passage for connecting said piston bore with atmosphere via an exhaust choke;

(b) an inlet check valve normally closed to prevent gas from such brake pipe from flowing into said supply passage;

(c) an outlet check valve normally closed to prevent gas from said return passage from flowing into such brake pipe; and (d) a piston biased in a normally closed position against said first end within said piston bore, said piston defining a passageway through which said first and second ends communicate such that (i) upon an increase in pressure within such brake pipe said inlet check valve opens causing said first end to pressurize and move said piston to an open position in which communication is established between said release and exhaust passages so that such brake cylinder vents gradually to atmosphere via said exhaust choke, and as pressure gradually equalizes between said first and second ends via said passageway, said piston returns to said normally closed position thereby discontinuing communication between said release and exhaust passages so that such brake cylinder ceases venting to atmosphere and (ii) upon a decrease in pressure within such brake pipe said outlet check valve opens causing pressure to equalize between said supply and return passages via said passageway and approximate pressure within such brake pipe.

2. The graduated release valve apparatus recited in claim 1 wherein said passageway includes a second choke through which pressure equalizes gradually between said supply and said return passages via said passageway.

3. The graduated release valve apparatus recited in claim 1 further including:

(a) a spring compressively situated between said second end of said piston bore and said piston for biasing said piston in said normally closed position; and (b) a plurality of o-rings each of which retained in a groove defined circumferentially in said piston for sealing said piston against an inner wall of said piston bore as said piston moves therein, said o-rings deployed along said piston so that said release and exhaust passages communicate when said piston occupies said open position and cease to communicate when said piston occupies said closed position.

4. The graduated release valve apparatus recited in claim 3 wherein said passageway includes a second choke through which pressure equalizes gradually between said supply and said return passages via said passageway.

5. A graduated release valve apparatus for incrementally reducing pressure in a first volume in response to increases in pressure occurring in a second volume, said graduated release valve apparatus comprising:

(a) a valve body defining a piston bore, a supply passage in communication with a first end of said piston bore, a return passage in communication with a second end of said piston bore, a release passage for connecting said piston bore with such first volume, and an exhaust passage for connecting said piston bore with atmosphere via an exhaust choke;

(b) an inlet check valve normally closed to prevent gas from such second volume from flowing into said supply passage;

(c) an outlet check valve normally closed to prevent gas from said return passage from flowing into such second volume; and (d) a piston biased in a normally closed position against said first end within said piston bore, said piston defining a passageway through which said first and second ends communicate such that (i) upon an increase in pressure within such second volume said inlet check valve opens causing said first end to pressurize and move said piston to an open position in which communication is established between said release and exhaust passages so that such first volume vents gradually to atmosphere via said exhaust choke, and as pressure gradually equalizes between said first and second ends via said passageway, said piston returns to said normally closed position thereby discontinuing communication between said release and exhaust passages so that such first volume ceases venting to atmosphere and (ii) upon a decrease in pressure within such second volume said outlet check valve opens causing pressure to equalize between said supply and return passages via said passageway and approximate pressure within such second volume.

6. The graduated release valve apparatus recited in claim 5 wherein said passageway includes a second choke through which pressure equalizes gradually between said supply and said return passages via said passageway.

7. The graduated release valve apparatus recited in claim 5 further including:

(a) a spring compressively situated between said second end of said piston bore and said piston for biasing said piston in said normally closed position; and (b) a plurality of o-rings each of which retained in a groove defined circumferentially in said piston for sealing said piston against an inner wall of said piston bore as said piston moves therein, said o-rings deployed along said piston so that said release and exhaust passages communicate when said piston occupies said open position and cease to communicate when said piston occupies said closed position.

8. The graduated release valve apparatus recited in claim 7 wherein said passageway includes a second choke through which pressure equalizes gradually between said supply and said return passages via said passageway.

9. A graduated release valve apparatus for incrementally reducing pressure in a first volume in response to increases in pressure occurring in a second volume, said graduated release valve apparatus comprising:

(a) a valve body defining a piston bore, a supply passage in communication with a first end of said piston bore, a return passage in communication with a second end of said piston bore, a release passage for connecting said piston bore with such first volume, and an exhaust passage for connecting said piston bore with atmosphere via an exhaust choke;

(b) a first valve means for allowing gas from such second volume to flow into said supply passage when pressure in such second volume increases relative to pressure in said supply passage;

(c) a second valve means for allowing gas from said return passage to flow into such second volume when pressure in such second volume decreases relative to pressure in said return passage;

(d) a piston biased in a normally closed position against said first end within said piston bore, said piston defining a passageway through which said first and second ends communicate such that (i) upon said increase in pressure within such second volume said first valve means opens causing said first end to pressurize and move said piston to an open position in which communication is established between said release and exhaust passages so that such first volume vents gradually to atmosphere via said exhaust choke, and as pressure gradually equalizes between said first and second ends via said passageway, said piston returns to said normally closed position thereby discontinuing communication between said release and exhaust passages so that such first volume ceases venting to atmosphere and (ii) upon said decrease in pressure within such second volume said second valve means opens causing pressure to equalize between said supply and return passages via said passageway and approximate pressure within such second volume.

10. The graduated release valve apparatus recited in claim 9 wherein said passageway includes a second choke through which pressure equalizes gradually between said supply and said return passages via said passageway.

11. The graduated release valve apparatus recited in claim 9 further including:

(a) a spring compressively situated between said second end of said piston bore and said piston for biasing said piston in said normally closed position; and (b) a plurality of o-rings each of which retained in a groove defined circumferentially in said piston for sealing said piston against an inner wall of said piston bore as said piston moves therein, said o-rings deployed along said piston so that said release and exhaust passages communicate when said piston occupies said open position and cease to communicate when said piston occupies said closed position.

12. The graduated release valve apparatus recited in claim 11 wherein said passageway includes a second choke through which pressure equalizes gradually between said supply and said return passages via said passageway.

13. The graduated release valve apparatus recited in claim 12 wherein:

(a) such first volume is a brake cylinder of a pneumatic brake system of a railcar; and (b) such second volume is a brake pipe of said pneumatic brake system.

* * * * *